(12) United States Patent
Zhan (10) Patent No.: US 10,880,285 B2
(45) Date of Patent: Dec. 29, 2020

(54) SELF-DRIVING VEHICLE TEST AUTHENTICATION

(71) Applicant: Baidu USA LLC, Sunnyvale, CA (US)

(72) Inventor: Jun Zhan, Beijing (CN)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 15/769,002

(22) PCT Filed: Jan. 3, 2018

(86) PCT No.: PCT/US2018/012253
§ 371 (c)(1),
(2) Date: Apr. 17, 2018

(87) PCT Pub. No.: WO2019/135745
PCT Pub. Date: Jul. 11, 2019

(65) Prior Publication Data
US 2020/0329022 A1   Oct. 15, 2020

(51) Int. Cl.
*H04L 29/06* (2006.01)
*H04L 9/32* (2006.01)
(Continued)

(52) U.S. Cl.
CPC .......... *H04L 63/08* (2013.01); *G06F 11/3457* (2013.01); *H04L 9/0637* (2013.01);
(Continued)

(58) Field of Classification Search
CPC ........ G06F 21/57; G06F 21/53; G06F 21/602; G06F 2212/152; G06F 2221/00;
(Continued)

(56) References Cited

U.S. PATENT DOCUMENTS 9,646,428 B1   5/2017 Konrardy et al.
2017/0132118 A1   5/2017 Stefan et al.
(Continued)

OTHER PUBLICATIONS

Vishnukumar et al. "Machine Learning and Deep Neural Network—Artificial Intelligence Core for Lab and Real-World Test and Validation . . . ", IEEE Xplore, IEEE Conferences, Sep. 1, 2017, 2017 Intelligent Systems Conference (IntelliSys), 714-721 (Year: 2017).*
(Continued)

*Primary Examiner* — Alexander Lagor
*Assistant Examiner* — Howard H. Louie
(74) *Attorney, Agent, or Firm* — Seed IP Law Group LLP (57) ABSTRACT

Embodiments of the present disclosure disclose a data authentication method, a data authentication apparatus, and a data authentication system. An embodiment of the data authentication method comprises: in response to receiving an authentication request submitted to authentication nodes in an authentication system for authenticating that a vehicle passes self-driving scene testing, verifying the authentication request, the authentication request containing simulation data regarding self-driving testing of the vehicle in a simulated driving scene and authentication award information; in the case of passing the verifying, generating an award record for an authentication node that completes verification first based on the authentication award information, and writing a verification result and the award record into a distributed data block chain corresponding to the authentication system. The embodiment realizes authentication to the driverless vehicle simulation testing data, which may ensure reliability of the authentication result while reducing the time and cost consumed for the authentication.

17 Claims, 6 Drawing Sheets

(51) Int. Cl.
  *G06F 11/34* (2006.01)
  *H04L 9/30* (2006.01)
  *H04L 9/06* (2006.01)

(52) U.S. Cl.
  CPC .............. *H04L 9/30* (2013.01); *H04L 9/3236* (2013.01); *H04L 2209/38* (2013.01)

(58) Field of Classification Search
  CPC ................ G06F 2221/034; G06F 11/34; H04L 41/0893; H04L 29/06; H04L 9/32; H04L 9/30; H04N 21/4437
  See application file for complete search history.

(56) References Cited

U.S. PATENT DOCUMENTS

| | | |
|---|---|---|
| 2017/0132334 A1 | 5/2017 | Levinson et al. |
| 2017/0139411 A1 | 5/2017 | Hartung et al. |
| 2017/0168809 A1 | 6/2017 | Zander |
| 2017/0286651 A1 | 10/2017 | Erhart et al. |
| 2017/0316127 A1 | 11/2017 | Han et al. |
| 2017/0374493 A1 | 12/2017 | Pereira Cabral et al. |
| 2018/0270065 A1* | 9/2018 | Brown .................. H04L 9/0637 |

OTHER PUBLICATIONS

Straub et al. "Automated testing of a self-driving vehicle system", IEEE Xplore, IEEE Conferences, Sep. 1, 2017, 2017 IEEE AUTOTESTCON, pp. 1-6 (Year: 2017).*

Search Report corresponding to co-pending PCT Application No. PCT/US2018/012253, United States Patent and Trademark Office, dated Mar. 26, 2018; (2 pages).

Written Opinion corresponding to co-pending PCT Application No. PCT/US2018/012253, United States Patent and Trademark Office, dated Mar. 26, 2018; (4 pages).

* cited by examiner

SELF-DRIVING VEHICLE TEST AUTHENTICATION

TECHNICAL FIELD

Embodiments of the present disclosure relate to the technical field of computers, specifically to the technical field of information transmission, and more particularly to a data authentication method, apparatus, and system.

BACKGROUND

In the field of driving, field driving testing is needed before vehicles are out of factory or after they are recalled with their problems fixed. Only after a certain mileage of safe driving, can they be put into the market.

Driverless technology has become a hot research issue due to its good prospect in safety and its smart route planning. Decisions and controls of a driverless vehicle are made by a control unit acting as an "Automobile Brain". The "Automobile Brain" uses algorithms to control driving behaviors of the vehicle in various road scenes. Testing is also needed for driverless vehicles before field driving. Currently, testing of a driverless vehicle usually adopts a method including recording driving data in field driving and authenticating the vehicle's driving data by an administrative department for automobiles.

SUMMARY

Embodiments of the present disclosure provide a data authentication method, a data authentication apparatus, and a data authentication system.

In a first aspect, an embodiment of the present disclosure provides a data authentication method, comprising: in response to receiving an authentication request submitted to authentication nodes in an authentication system for authenticating that a vehicle passes self-driving scene testing, verifying the authentication request, the authentication request containing simulation data regarding self-driving testing of the vehicle in a simulated driving scene and authentication award information; in the case of passing the verifying, generating an award record for an authentication node that completes verification first based on the authentication award information, and writing a verification result and the award record into a distributed data block chain corresponding to the authentication system.

In some embodiments, the authentication request is generated by signing, with a private key corresponding to a user's account, the simulation data submitted by the user regarding the self-driving testing of the vehicle in the simulated driving scene; and the verifying the authentication request comprises: retrieving a public key corresponding to the user's account, and deciphering the authentication request with the user's public key; and verifying the deciphered simulation data.

In some embodiments, the simulation data includes a simulation log; and the verifying the deciphered simulation data comprises: recording the deciphered simulation data, and monitoring whether a recording result issued from other authentication node(s) has been received before the recording is successful; if the recording is successful before receiving the recording result issued from the other authentication node(s), broadcasting a recording result to the other authentication node(s) such that the authentication node(s) receiving the recording result checks the recording result according to a preset check rule; if the recording is unsuccessful before receiving the recording result issued from the other authentication node(s), checking the received recording result according to the preset check rule; in response to the number of authentication nodes where the checking passes satisfying a first preset condition, determining that the simulation data passes the verifying, and generating a verification result based on the recording result recorded for the simulation data.

In some embodiments, the recording the deciphered simulation data comprises: combining the simulation log and data already stored in the data block chain to form a record list, and executing an authentication operation below: performing a Hash operation based on a random number and the record list, and determining whether a Hash operation result satisfies a preset target value; if so, determining that the simulation log is successfully recorded, and generating a recording result containing the random number and the simulation data; if not, changing the random number, and performing the authentication operation.

In some embodiments, the simulation data includes a binary simulation file; and the verifying the deciphered simulation data comprises: executing the binary simulation file, determining whether the vehicle passes the self-driving testing based on an execution result, and broadcasting a determination result to the other authentication node(s); and in response to the number of authentication nodes which determine that the vehicle passes the self-driving testing satisfying a second preset condition, generating a verification result for indicating that the authentication request passes the verification.

In some embodiments, the generating an award record for an authentication node that completes verification first based on the authentication award information comprises: generating a record of associating an award indicated by the authentication award information with a wallet address corresponding to the authentication node that first completes the verification.

In some embodiments, the data authentication method further comprises: retrieving the simulation data submitted by the user regarding the self-driving testing of the vehicle in the simulated driving scene; and submitting the authentication request to the authentication nodes in the authentication system for authenticating that the vehicle passes the self-driving scene testing.

In a second aspect, an embodiment of the present disclosure provides a data authentication apparatus, comprising: a verification unit configured to: in response to receiving an authentication request submitted to authentication nodes in an authentication system for authenticating that a vehicle passes self-driving scene testing, verify the authentication request, the authentication request containing simulation data regarding self-driving testing of the vehicle in a simulated driving scene and authentication award information; and a storage unit configured to: in the case of passing the verifying, generate an award record for an authentication node that completes verification first based on the authentication award information, and write a verification result and the award record into a distributed data block chain corresponding to the authentication system.

In a third aspect, an embodiment of the present disclosure provides a data authentication system, comprising: at least two authentication nodes that store data using a distributed data block chain, the authentication nodes being configured to: in response to receiving an authentication request for authenticating that a vehicle passes self-driving scene testing, verify the authentication request, the authentication request containing simulation data regarding self-driving testing of the vehicle in a simulated driving scene and authentication award information; in the case of passing the verifying, generate an award record for an authentication node that completes verification first based on the authentication award information, and write a verification result and the award record into a distributed data block chain corresponding to the authentication system.

In some embodiments, the authentication request is generated by signing, using a private key corresponding to a user's account, the simulation data submitted by the user regarding the self-driving testing of the vehicle in the simulated driving scene; and the authentication nodes verify the authentication request by: retrieving a public key corresponding to the user's account, and deciphering the authentication request with the user's public key; and verifying the deciphered simulation data.

In some embodiments, the simulation data includes a simulation log; and the authentication nodes verify the authentication request by: recording the deciphered simulation data, and monitoring whether a recording result issued from other authentication node(s) has been received before the recording is successful; if the recording is successful before receiving the recording result issued from the other authentication node(s), broadcasting a recording result to the other authentication node(s) such that the authentication node(s) receiving the recording result checks the recording result according to a preset check rule; if the recording is unsuccessful before receiving the recording result issued from the other authentication node(s), checking the received recording result according to the preset check rule; in response to the number of authentication nodes where the checking passes satisfying a first preset condition, determining that the simulation data passes the verifying, and generating a verification result based on the recording result recorded for the simulation data.

In some embodiments, the authentication nodes record the deciphered simulation data by: combining the simulation log and data already stored in the data block chain to form a record list, and executing an authentication operation below: performing a Hash operation based on a random number and the record list, and determining whether a Hash operation result satisfies a preset target value; if so, determining that the simulation log is successfully recorded, and generating a recording result containing the random number and the simulation data; if not, changing the random number, and performing the authentication operation.

In some embodiments, the simulation data includes a binary simulation file; and the authentication nodes check the deciphered simulation data by: executing the binary simulation file, determining whether the vehicle passes the self-driving testing based on an execution result, and broadcasting a determination result to the other authentication node(s); and in response to the number of authentication nodes which determine that the vehicle passes the self-driving testing satisfying a second preset condition, generating a verification result for indicating that the authentication request passes the verification.

In some embodiments, the authentication nodes generate an award record by: generating a record of associating an award indicated by the authentication award information with a wallet address corresponding to the authentication node that first completes the verification.

In some embodiments, the authentication nodes are further configured to: retrieve the simulation data submitted by the user regarding the self-driving testing of the vehicle in the simulated driving scene; and submit the authentication request to the other authentication node(s) in the authentication system for authenticating that the vehicle passes the self-driving scene testing.

In a fourth aspect, an embodiment of the present disclosure provides an electronic device, comprising: one or more processors; and a storage storing one or more programs which, when being executed by the one or more processors, cause the one or more processors to implement a data authentication method provided by the first aspect.

In a fifth aspect, an embodiment of the present disclosure provides a computer readable storage medium on which a computer program is stored, wherein when the program is executed by the processor, the data authentication method provided by the first aspect is implemented.

The data authentication method, apparatus, and system provided by the embodiments of the present disclosure realizes authentication of the driverless vehicle simulation testing data through the following steps: in response to receiving an authentication request submitted to authentication nodes in an authentication system for authenticating that a vehicle passes self-driving scene testing, verifying the authentication request, the authentication request containing simulation data regarding self-driving testing of the vehicle in a simulated driving scene and authentication award information; in the case of passing the verifying, generating an award record for an authentication node that completes verification first based on the authentication award information, and writing a verification result and the award record into a distributed data block chain corresponding to the authentication system. The present disclosure may ensure reliability of the authentication result while reducing the time and cost consumed for the authentication.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF EMBODIMENTS

Hereinafter, the present disclosure will be described in further detail with reference to the accompanying drawings and the embodiments. It will be appreciated that the embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
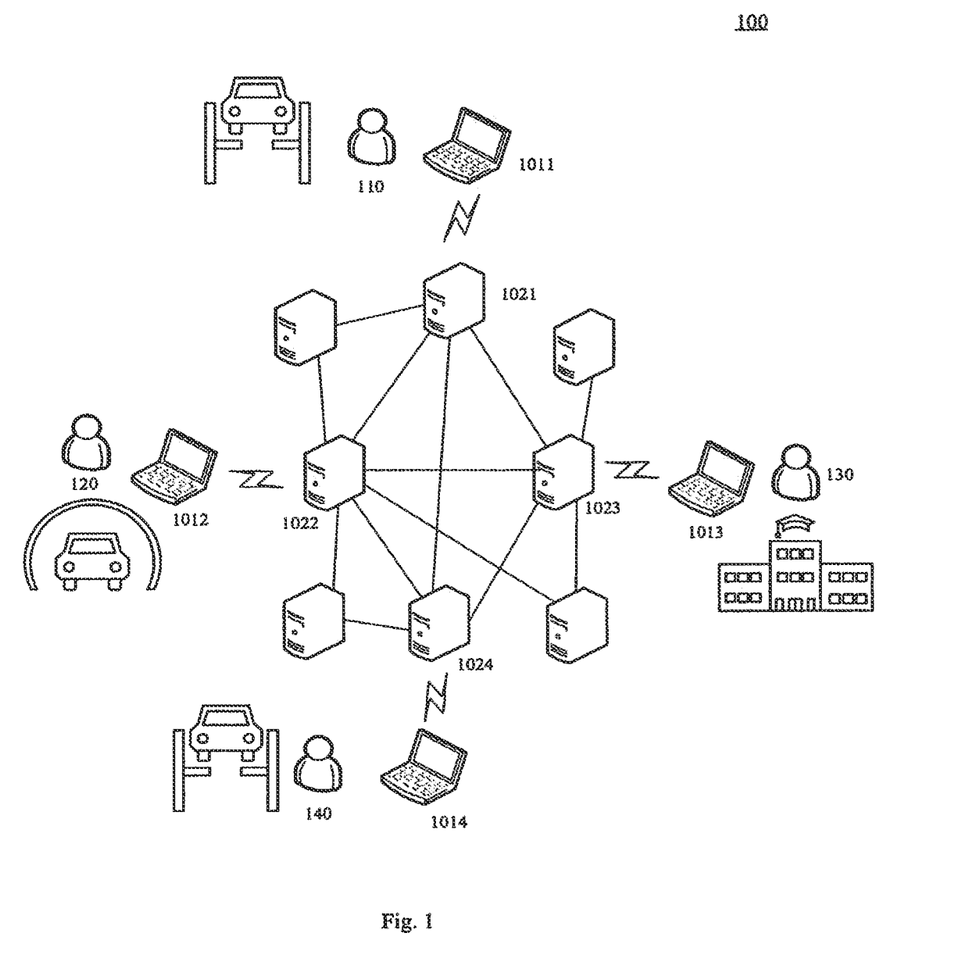
FIG. 1 is an exemplary system architecture diagram in which the present disclosure may be applied.

FIG. 1 shows an exemplary system architecture 100 in which the embodiments of a data authentication method of the present disclosure may be applied.

As shown in FIG. 1, the system architecture 100 may comprise terminals 1011, 1012, 1013, 1014, and so on, servers 1021, 1022, 1023, 1024, and so on, and a network. The network is a medium for providing a communication link between the terminal 1011 and the server 1021, between the terminal 1012 and the server 1022, between the terminal 1013 and the server 1023, and between the terminal 1014 and the server 1024. The network may include various kinds of connection types, e.g., a wired communication link, a wireless communication link, or an optical cable, etc.

The servers 1021, 1022, 1023, and 1024 and so on may be nodes in the data authentication system providing data authentication services, for processing an authentication request submitted to the data authentication system. The servers 1021, 1022, 1023, and 1024 and so on may form a distributed data storage architecture to store the data accessed to the data authentication system. The respective servers may be connected via the network.

The terminals 1011, 1012, 1013, and 1014 may be terminals used for different user groups. In a scenario of this embodiment, the terminals 1011, 1012, 1013, and 1014 may be terminals used for an automobile manufacturer user 110, a vehicle administration government agency user 120, an OEM (Original Equipment Manufacturer) user 130, and a university user 140, respectively. These users may use corresponding terminals to access the data authentication system, submit an authentication request to the data authentication system, or execute an authentication assignment of the data authentication system.

Correspondingly, respective servers 1021, 1022, 1023, and 1024 and so on as authentication nodes may be servers that provide computing services and storage services, which are needed for authentication, for the automobile manufacturer, the automobile administration government agency, the OEM, and the institution such as a university. For example, the servers 1021, 1022, 1023, and 1024 shown in FIG. 1 are servers that provide data authentication and data storage services for the automobile manufacturer, the automobile management government agency, the OEM, and the university, respectively.

The terminals 1011, 1012, 1013, and 1014 and so on may be installed with a data authentication application via which the users may interact with the corresponding servers 1021, 1022, 1023, and 1024 and so on. The authentication system consisting of the servers 1021, 1022, 1023, and 1024 and so on may transmit a data authentication result to corresponding terminals.

It needs to be noted that the data authentication method provided by the embodiments of the present disclosure may be executed by the servers 1021, 1022, 1023, and 1024 and so on in the system architecture.

It should be understood that the numbers of the terminals, networks and servers are only schematic. According to implementation needs, any numbers of terminals, networks, and servers are feasible. For example, a server may be a cluster server, including a plurality of servers deployed with different processes.

Figure 2:
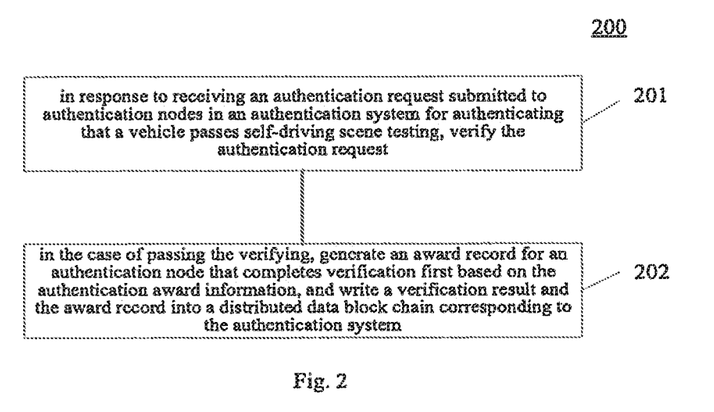
FIG. 2 is a flow diagram of an embodiment of a data authentication method according to the present disclosure.

Now, refer to FIG. 2, in which a flow 200 of an embodiment of a data authentication method according to the present disclosure is presented. The data authentication method comprises steps of:

Step 201: in response to receiving an authentication request submitted to authentication nodes in an authentication system for authenticating that a vehicle passes self-driving scene testing, verifying the authentication request.

The authentication request may contain simulation data regarding self-driving testing of the vehicle in a simulated driving scene and authentication award information.

The authentication system may be a system applied to authenticate the simulation driving data of a driverless vehicle, and the authentication nodes in the authentication system may include nodes where data authentication services are executed by the servers corresponding to user entities such as a government department (e.g., a vehicle administration government agency), a research institution such as a university, a vehicle manufacturer, and an OEM (which may be a manufacturer manufacturing main engines); each authentication node is associated with one user account, and each node may be deployed with one or more servers; besides, each node may include an authentication client installed on the terminal; the authentication client may provide a user interface for a user to interact with the authentication system.

In this embodiment, an electronic device (e.g., a server shown in FIG. 1) on which the data authentication method may be executed may monitor whether an authentication node in the authentication system submits an authentication request; the authentication request may be a request for authenticating that the vehicle passes the self-driving scene testing, which request may contain simulation data regarding self-driving testing of the vehicle in the simulated driving scene and the authentication award information.

The vehicle manufacturer may execute simulation services regarding test driving behaviors of a vehicle in a simulator provided by a self-driving open platform. The simulator in the self-driving open platform may provide a series of simulated driving scenes. These simulated driving scenes may be constructed by road scene data. Specifically, a simulated driving scene may be constructed by real road scenes acquired by vehicle sensors, e.g., the simulated driving scene may be constructed by acquiring data regarding lane markers, traffic lamps, passengers, and surrounding vehicles at crossroads as well as data from respective sensors when the vehicle is making a turn; a simulated driving scene may also be constructed based on simulation scene data that are set according to testing needs, e.g., the simulated driving scenes may be constructed by setting positions of road obstacles and manipulation data when the vehicle avoids an obstacle.

Self-driving testing may be conducted in the simulated driving scene to acquire manipulation data generated when the vehicle is travelling in the scene, and the simulation data is generated based on the scene data in the simulated driving scene and the manipulation data of the vehicle during the testing process. After the simulation data is generated, it may be submitted to the authentication system to request for authentication. Meanwhile, authentication award information may be submitted. The authentication award information is configured for indicating an award that may be obtained after the simulation data is successfully authenticated. The award is provided by a user that issues the authentication request. The authentication request may be issued after the vehicle passes one or more testing in the simulated driving scene, which may be an authentication request stating that the vehicles passes a certain testing.

The electronic device on which the data authentication method is executed may be an authentication node in the authentication system; when the authentication request issued from other authentication node(s) is monitored, the request may be subject to a verification operation. Specifically, authenticity or credibility of the simulation data may be verified. The verification may be made by parsing the simulation data to obtain the vehicle's various performance data, simulated driving scene data, and manipulation data of the vehicle tested in the simulated driving scene, and then determining whether the vehicle is qualified based on the parsed data, wherein the performance data of the vehicle may include, for example, the vehicle's power performance data, braking performance data, obstacle-avoidance performance data, reliability data regarding safely completing a trip, and driving stability data, etc., and verification of the vehicle's performance data may include determining whether the vehicle's performances reach a qualification index. The simulated driving scene data and the manipulation data of the vehicle in the simulated driving scene may also be analyzed to determine whether the vehicle meets a safe driving standard, e.g., determining whether the vehicle may avoid an obstacle reasonably, and whether it may brake promptly in emergency, etc.

In some optional implementations of this embodiment, various authentication nodes in the authentication system may simultaneously execute the operations of verifying the authentication request. Generally, the verification operations take a certain time. Because different authentication nodes have different computation ability, the time taken by respective authentication nodes to execute the verification operations might be different. Optionally, each authentication node in the authentication system may release a message that it has completed the verification with a verification result of "qualified"; when the number of authentication nodes which determine a "qualified" verification result exceeds a preset number, it may be determined that the verification passes.

In some optional implementations of this embodiment, when an authentication node in the authentication system determines that the vehicle passes the testing according to the qualification condition above, it may be determined that the authentication request passes the verification. At this point, the authentication node may broadcast a message of passing the verification in the authentication system to inform other authentication node(s) of the verification result.

Step 202: in the case of passing the verifying, generating an award record for an authentication node that completes verification first based on the authentication award information, and writing a verification result and the award record into a distributed data block chain corresponding to the authentication system.

All of the authentication nodes in the authentication system may execute the verification operation. In this embodiment, if the electronic device on which the data authentication method is executed determines that the authentication request passes the verification, an award record of the authentication node that first completes the verification may be generated. The award record may be generated based on the authentication award information contained in the issued authentication request. The authentication award information may include an award amount, an award manner, etc. Each authentication node may have a unique identifier, e.g., the unique identifier may be associated with a unique user account; an association relationship between the authentication award information and the identifier of the authentication node that first completes the verification may be recorded; or the award amount in the authentication award information is recorded into an award information set corresponding to the authentication node that first completes the verification.

The authentication system may store data in a fashion of a distributed data block chain. The data block chain refers to chained data blocks, wherein each data block may include relevant data regarding one verification. The distributed data block chain adopts a distributed data structure to store the data blocks in a chained fashion. The respective nodes in the authentication system may maintain identical data block chains. In this embodiment, if the electronic device is the authentication node that first completes the verification, the electronic device may package the verification result and the award record into a new data block that is added to an end of the distributed data block chain; if the electronic device is not the authentication node which completes the verification first, the electronic device may obtain a verification result transmitted from other authentication node(s) and package the generated award record and the verification result into a new data block that is added to the end of the distributed data block chain. Here, the verification result may contain a verification conclusion, e.g., "vehicle performance data are qualified," "the manipulation data of the vehicle in the simulated driving scene meet the standard for safe driving" and the like, which may also include the data generated during the verification process, e.g., the parameters used during the data parsing process, and data generated after transformation of the simulation data, etc.

The data authentication method provided by the above embodiment of the present disclosure realizes authentication to the driverless vehicle simulation testing data through the following steps: in response to receiving an authentication request submitted to authentication nodes in an authentication system for authenticating that a vehicle passes self-driving scene testing, verifying the authentication request, the authentication request containing simulation data regarding self-driving testing of the vehicle in a simulated driving scene and authentication award information; in the case of passing the verifying, generating an award record for an authentication node that completes verification first based on the authentication award information, and writing a verification result and the award record into a distributed data block chain corresponding to the authentication system. The present disclosure may ensure reliability of the authentication result while reducing the time and cost consumed for the authentication.

In some embodiments, the authentication request is generated by signing, with a private key corresponding to a user's account, the simulation data submitted by the user regarding the self-driving testing of the vehicle in the simulated driving scene. In this case, the verifying the authentication request in the step 201 may be performed by: retrieving a public key corresponding to the user's account, and deciphering the authentication request using the user's public key; and verifying the deciphered simulation data.

Specifically, the respective authentication node may obtain an account identifier of the user it serves, which identifier may be a private key corresponding to the user account, or user identity information associated with the private key or public key corresponding to the account of the user. The associated private key or public key corresponding to the account of the user may be retrieved through the identifier. In some cases, when submitting, through the client, the simulation data regarding the self-driving testing of the vehicle in the simulated driving scene, the user may simultaneously submit its account identifier, or submit the private key and public key; in this way, the server connected with the client may sign the simulation data submitted with the private key and broadcast the public key to respective authentication nodes of the authentication system. Specifically, an abstract may be generated by performing a Hash operation on the simulation data and then be encrypted with the private key. The encrypted abstract, which is used as the signature of the abstract of the simulation data, is merged with the simulation data to generate an authentication request.

The electronic device on which the data authentication method is executed may obtain the public key corresponding to the account of the user submitting the simulation data, and decipher the authentication request with the public key. Specifically, upon deciphering, the received simulation data may be subject to a Hash operation to generate an abstract, and then the received signature is deciphered with the public key; if the deciphered abstract is identical to that generated from performing the Hash operation to the simulation data, it may be determined that the simulation data is submitted by the user owning the public key; in this way, the identity of the user submitting the authentication request may be identified.

In an actual scenario, the user served by the respective authentication node has a unique identification that corresponds to a unique private key-public key pair, e.g., supposing an identifier of certain brand automobile manufacturer is A, then when submitting the simulation data, the user A may sign the simulation data with its private key such that the authentication nodes in the authentication system identify, after deciphering with the public key, that the simulation data is submitted by user A. In this way, it may be guaranteed that the data source authenticated by the authentication system is retrospective, thereby improving reliability of the authentication system.

When the user submits the simulation data, the authentication award information may be submitted together; then when signing, the simulation data and the authentication award information may be subject to the Hash operation together to obtain an abstract which is then digitally signed. In this way, respective authentication nodes including the electronic device on which the data authentication method is executed may obtain, through deciphering, the simulation data and the authentication award information and identify the submitter's identity.

In the embodiment, the simulation data submitted by the user may be a simulation log or a binary simulation file, wherein the simulation log may be descriptions or records of relevant events such as time, user, and detailed operation contents of the simulation operation, etc.; such relevant information may be retrieved through the simulation log, but the simulation process cannot be reproduced. The binary simulation file is an executable file, which is generated by compiling the source code of the simulation testing. The simulation process may be reproduced by executing the binary simulation file to further observe whether the vehicle passes the self-driving scene testing.

Figure 3:
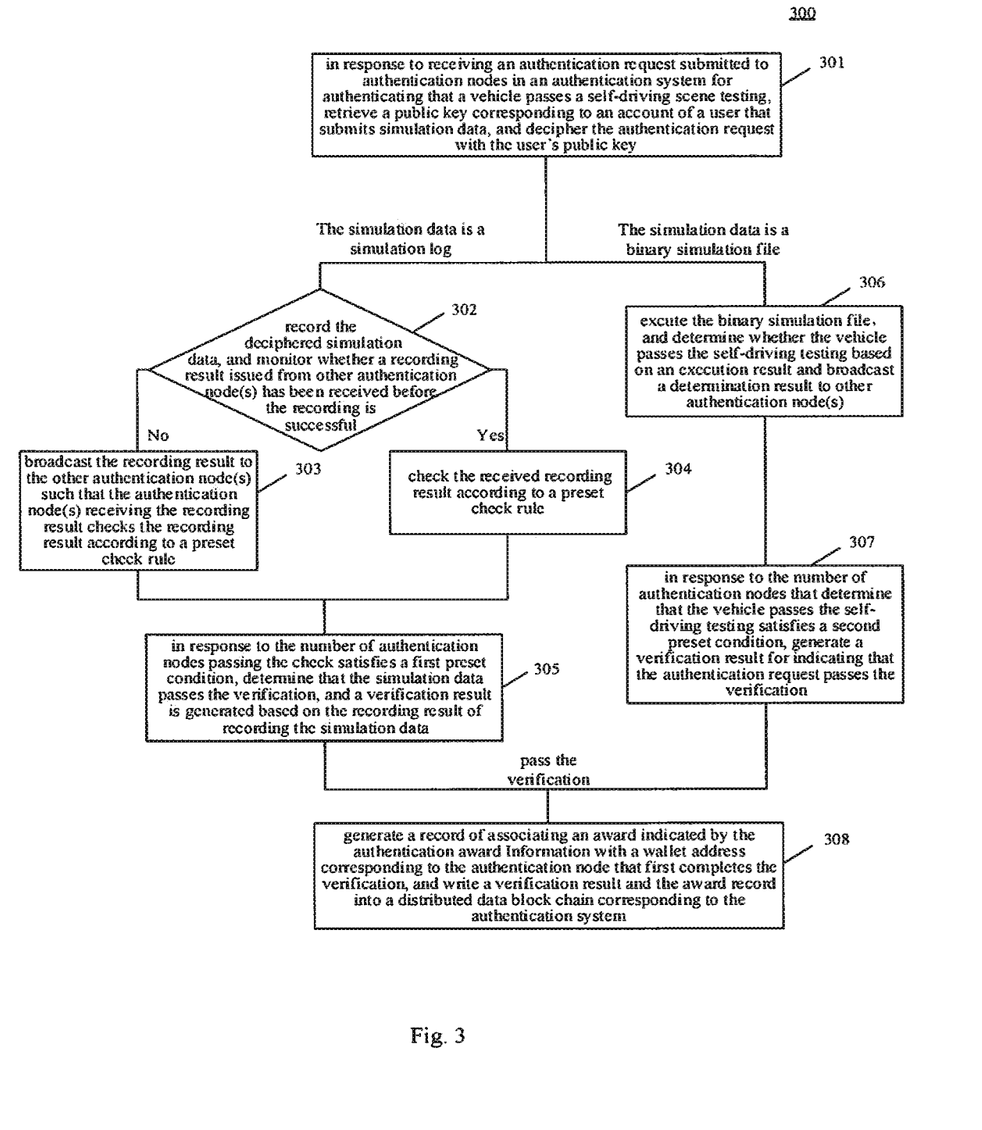
FIG. 3 is a flow diagram of another embodiment of a data authentication method according to the present disclosure.

Different methods may be adopted to verify the authentication requests containing different simulation data. Please refer to FIG. 3, which shows a flow diagram of another embodiment of a data authentication method according to the present disclosure. The flow 300 of the data authentication method comprises steps of:

Step 301: in response to receiving an authentication request submitted to authentication nodes in an authentication system for authenticating that a vehicle passes a self-driving scene testing, retrieving a public key corresponding to an account of a user that submits simulation data, and deciphering the authentication request with the user's public key.

After the user submits, through a client, the simulation data regarding self-driving testing of the vehicle in a simulated driving scene and authentication award information, the corresponding node may broadcast the authentication request containing the simulation data and the authentication award information in the authentication system. After receiving the authentication request, an electronic device on which the data authentication method may be executed may retrieve the public key corresponding to the account of the user submitting the simulation data and decipher with the public key to obtain the simulation data, the authentication award information, and the user's identity verification result.

Next, if the simulation data includes a simulation log, step 302 is executed to record the deciphered simulation data, and monitor whether a recording result issued from other authentication node(s) has been received before the recording is successful.

In this embodiment, the electronic device may record the deciphered simulation data, and other authentication node(s) may also receive the authentication request, decipher the simulation data with the public key, and execute a recording operation on the simulation data. During recording the simulation data, the electronic device may monitor whether the recording result issued from the other authentication node(s) have been received.

Generally, different authentication nodes have different computation ability, and the time they take to perform the recording operation is also different, wherein the computation ability may refer to a rate of executing an operation. In this embodiment, when one of the authentication nodes successfully records, it may broadcast the recording result to other authentication node(s); after receiving the recording result, the other authentication node(s) may stop executing the recording operation. In other words, respective authentication nodes in the authentication system may simultaneously execute the recording operation; after the authentication node that is the first to record successfully broadcasts a message that it completes the recording, the other node(s) terminate the recording operation to ensure consistency between the generated data block chains. Therefore, while an authentication node is performing the recording operation, it needs to detect whether it receives a recording result broadcast from the other authentication node(s).

Optionally, the step of recording the deciphered simulation data may be implemented by: firstly, combining the simulation log and the data already stored in the data block chain to form a record list, and performing an authentication operation. The authentication operation comprises: performing a Hash operation based on a random number and the record list, and determining whether a Hash operation result satisfies a preset target value; if so, determining that the simulation log is successfully recorded, and generating a recording result containing the random number and the simulation data; if not, changing the random number, and performing the authentication operation. Here, the preset target value may be set by a platform developer, which the platform provides the simulated driving scene.

Specifically, the existing data blocks in the data block chain and the simulation log are packaged into a record list, and a Merkle Root Hash is generated through a Merkle Tree algorithm. Then, the Merkle Root Hash, the random number nonce, and other relevant fields are combined to form a block header. The relevant fields may include a Hash value of a preceding data block, a timestamp, a preset target value and the like. Afterwards, the block header is subject to double Hashing operation with a Hash value of 256 bits (double SHA256 operation), and a Hash operation result is compared with the preset target value for checking consistency. If the Hash operation result is consistent with the preset target value, it may be determined that the recording is successful, and then a recording result containing the current random number and the simulation data is generated; if the Hash operation result is inconsistent with the preset target value, the random number is changed, and the process will return to repetitively execute the steps of combining the Merkle Root Hash, the random number nonce, and the relevant fields into a block header, performing double SHA256 operation to the block header, and determining whether the Hash operation result is consistent with the preset target value, till the Hash operation result is consistent with the preset target value or a record result issued from other authentication node(s) is received; then the authentication operation will be terminated.

When it is determined that the simulation log is successfully recorded, the block header consisting of the Merkle Root Hash, the random number nonce, and the relevant fields are combined with the simulation log into a new data block. The new data block is just the recording result.

If the monitoring result in step 302 is "No," i.e., the recording has been successful before receiving the recording result issued from other authentication node(s), step 303 is executed to broadcast the recording result to the other authentication node(s) such that the authentication node(s) receiving the recording result checks the recording result according to a preset check rule.

Specifically, if the simulation data is successfully recorded before receiving the recording result issued from the other authentication node(s), the electronic device that is the first one recording successfully may broadcast the recording result to other authentication node(s), such that the other authentication node(s) write the recording result into the data block chain after checking, thereby guaranteeing the consistency between the data block chains stored by different authentication nodes. The recording result may include: time of completing the recording, simulation data, and parameters used in the recording operation, etc.

If the monitoring result in step 302 is "Yes," i.e., the recording fails before receiving the recording result issued from the other authentication node(s), step 304 is executed to check the recording result according to a preset check rule.

After receiving the recording result broadcast from the other authentication node(s), the recording result may be checked. The check rule may be preset, e.g., whether the number of bytes included is smaller than a preset byte number, whether the parameters used for the recording operation are within a preset range, and whether the data generated after transforming the simulation data with the parameters used by the recording operation satisfy a preset condition, etc.

Optionally, the preset check rule may include various rules associated with the structure of the data block and respective data in the data block if the recording operation is performed by: combining the simulation log and the data already stored in the data block chain to form a record list, performing an authentication operation, wherein the authentication operation includes performing a Hash operation based on a random number and the record list and determining whether a Hash operation result satisfies a preset target value; if so, determining that the simulation log is successfully recorded, wherein a recording result containing the random number and the simulation data is generated; and if not, changing the random number and performing the authentication operation, wherein the recording result includes a data block consisting of the Merkle Root Hash, the random number nonce, the relevant fields. For example, the preset check rule may include, but not limited to, the data structure of the data block being a preset data structure, whether the double SHA 256 operation result regarding the block header consisting of the Merkle Root Hash, the random number nonce, and the relevant fields is consistent with the preset target value, whether the byte number of the simulation data satisfies a preset condition, and rules associated with fields such as the timestamp, etc.

After the checking passes, the check result and the recording result may be broadcast to other node(s) such that the other node(s) check the recording result.

After Step 303 or 304, Step 305 is performed to: in response to the number of authentication nodes passing the check satisfies a first preset condition, determine that the simulation data passes the verification, and a verification result is generated based on the recording result of recording the simulation data.

After the checking passes, respective authentication nodes in the authentication system may broadcast the check result and the recording result received from the node that first completes the recording operation to the other authentication node(s). The check result may include a message of passing the check or a message of failing the check. When receiving the message of passing the check transmitted from the authentication nodes the number of which satisfies the first preset condition, it may be determined that the simulation data passes the verification. In this case, a verification result may be generated based on the recording result of the simulation data; specifically, a data block containing the recording result may be generated as a verification result. Optionally, if the recording result is a data block consisting of the Merkle Root Hash, the random number nonce, the relevant fields, and the simulation data, the recording result may be used as the verification result for the simulation data.

The first preset condition may be no less than a first threshold, or may be exceeding half of the number of authentication nodes in the authentication system. When the number of authentication nodes where the check passes satisfies the first preset condition, it may be regarded that enough authentication nodes have reached a consensus on confirming the credibility and reliability of the simulation data; at this point, it may be determined that the simulation data passes the verification, and then a verification result may be generated based on the recording result obtained when verifying the authentication request.

During the flow from step 301 through step 305, all of the authentication nodes in the authentication system may perform verification of the authentication request; and the respective authentication nodes share information through broadcasting. Moreover, after one authentication node thereof completes data recording, the other authentication node(s) ensures the reliability of the verification result by checking the recording result. Respective authentication nodes in the authentication system form a block chain network. The condition for a successful data recording is to find an eligible random number, such that the recording result is not easily tampered, thereby realizing a decentralized data authentication system and enhancing the security of the data authentication system.

If the result of the step 301 is that the simulation data is a binary simulation file, the binary simulation file may be executed by performing step 306, to determine whether the vehicle passes the self-driving testing based on an execution result and broadcast a determination result to other authentication node(s).

The binary simulation file is an executable file generated after compiling the source code for implementing a simulation logic. By executing the binary simulation file, all data of the self-driving testing of the vehicle in the simulated driving scene may be recovered. These data include the vehicle's travelling status data, road scene data, and manipulation data, etc. Whether the vehicle passes the self-driving testing may be determined based on the execution result. Specifically, it may be determined whether the driving state and manipulation of the vehicle in the simulated driving scene reaches a preset standard. Here, the preset standard may include safety and stability standards of self-driving. For example, it may be determined whether the vehicle may correctly identify traffic signals at a crossroad, whether the vehicle may avoid passengers and other vehicles, whether there is a motoring offence, whether the route planning is reasonable, etc. After executing the binary file, a determination result may be broadcast to other authentication nodes, i.e., sharing the verification result of a single authentication node in the authentication system.

Next, step S307 is executed to: in response to the number of authentication nodes that determine that the vehicle passes the self-driving testing satisfies a second preset condition, generate a verification result for indicating that the authentication request passes the verification.

After receiving a determination result confirming that the vehicle passes the self-driving testing as issued by the authentication nodes the number of which satisfies the second preset condition, it may be determined that the authentication request passes the verification and a verification result for indicating that the authentication request passes the verification is generated.

Through the procedures in step 301, step 306, and step 307, verification of the authentication request containing the binary simulation file may be implemented.

After the step 305 or the step 307, if it is determined that the verification passes, step 308 is executed to generate a record of associating an award indicated by the authentication award information with a wallet address corresponding to the authentication node that first completes the verification, and write a verification result and the award record into a distributed data block chain corresponding to the authentication system.

In this embodiment, each authentication node has a wallet address that may be a character string. Benefits associated with the wallet address may be ascribed to a user corresponding to the authentication node. Optionally, the wallet address may be generated from performing a Hash operation with the public key of the user; each authentication node may perform the Hash operation with the public key of the authentication node that first completes the verification to obtain the wallet address of the authentication node that first completes the verification, associate the award indicated by the authentication award information with the wallet address, and record the verification result together into the distributed data block chain, wherein the authentication node that first completes the verification may be an authentication node that first completes the recording operation on the simulation log and broadcasts the recording result, or an authentication node that first completes execution of the binary simulation file and determines the execution result.

In an actual scenario, an award rule may be set regarding the award that may be obtained after completing the verification. The amounts of awards that need to be granted to different types of simulation data may be different. For example, when the simulation data submitted by the user is a simulation log, because the simulation log cannot completely reproduce the simulation process, the verification will be rather difficult, such that an award that needs to be granted should be set with a relatively large amount; when the simulation data submitted by the user is a binary simulation file, because the binary simulation file may reproduce the simulation process, the verification will have a relatively low difficulty, such that an award that needs to be granted should be set with a relatively small amount. When submitting the simulation data, the user needs to grant an award with an amount corresponding to the simulation data type. In this way, more authentication nodes are encouraged to join the authentication system through the authentication award information to perform the authentication operations, which enhances stability of the authentication system.

In some alternative implementations of the various embodiments above, the data authentication method may further comprise: retrieving simulation data submitted by the user regarding self-driving testing of the vehicle in the simulated driving scene; submitting an authentication request for authenticating that the vehicle passes the self-driving scene testing to the authentication nodes in the authentication system. In other words, the electronic device on which the data authentication method is executed, as a node in the authentication system, may act as a requesting device to receive the simulation data submitted by the user and submit the authentication request to other authentication node(s) in the authentication system.

Specifically, after the authentication node accesses the authentication system, the user may submit, through the client of the authentication node, the simulation data regarding the self-driving testing of the vehicle in the simulated driving scene, and request the authentication system to verify. The client may submit the simulation data to a server of the authentication node, and the server issues, to other authentication node(s), an authentication request for authenticating that the vehicle passes the self-driving scene testing. In an actual scenario, after the automobile manufacturer or a research institution completes testing of a vehicle on a self-driving simulation platform, it may submit a request containing the simulation data to the authentication system, stating in the request that the vehicle has passed the testing. At this time, the authentication node corresponding to the automobile manufacturer or research institution is a requesting end, while other authentication node(s) in the authentication system may act as a receiving end to verify the received authentication request.

In this way, respective authentication nodes in the authentication system in which the data authentication method is applied may act as a requesting end to issue an authentication request or as a receiving end to verify the authentication request. A communication connection is established between respective authentication nodes via a network, forming a "decentralized" authentication system, such that the reliability of data authentication is ensured.

Figure 4:
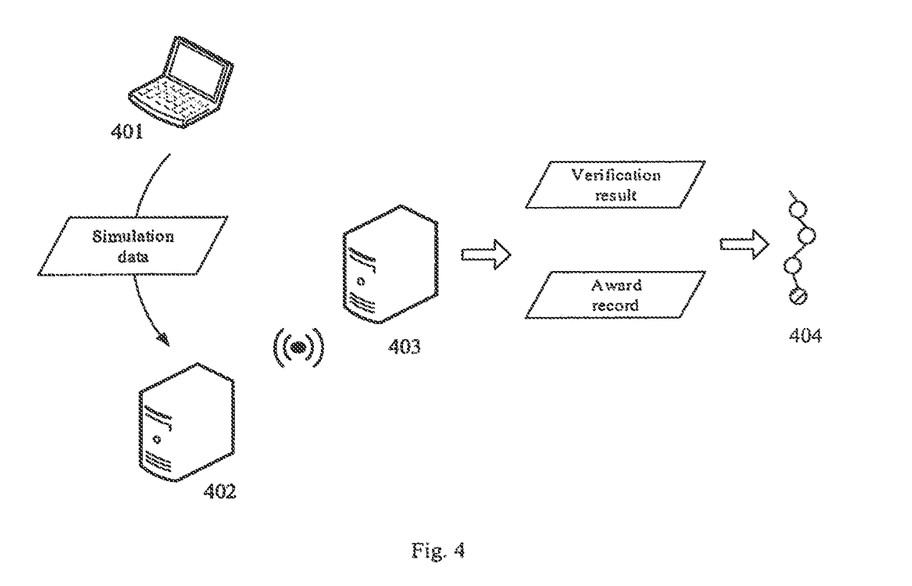
FIG. 4 is a schematic diagram of an application scenario of a data authentication method according to the present disclosure.

FIG. 4 is a schematic diagram of an application scenario for a data authentication method according to the embodiments of the present disclosure. As shown in FIG. 4, the server 403 may receive an authentication request broadcast by the server 402, which authentication request is generated by the server 402 based on the simulation data submitted by the terminal 401, containing simulation data and authentication award information. The server 403 may execute a verification operation on the authentication request to generate a verification result and an award record, and package the verification result and the award record into a new data block to be added into the distributed data block chain.

Figure 5:
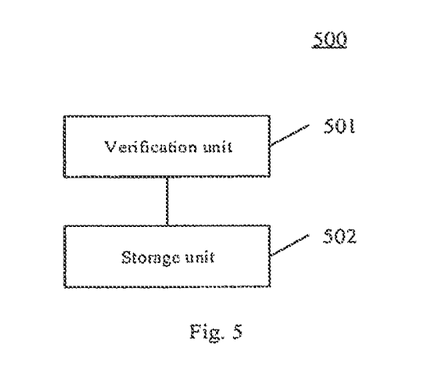
FIG. 5 is a structural diagram of an embodiment of a data authentication apparatus according to the present disclosure.

Now, refer to FIG. 5, to implement the methods shown in the above figures, the present disclosure provides an embodiment of a data authentication apparatus; this apparatus embodiment corresponds to the method embodiment shown in FIG. 2; and this apparatus may specifically be applied to various kinds of electronic devices.

As shown in FIG. 5, the data authentication apparatus 500 in this embodiment may comprise: a verification unit 501 and a storage unit 502, wherein the verification unit 501 is configured to: in response to receiving an authentication request submitted to authentication nodes in an authentication system for authenticating that a vehicle passes self-driving scene testing, verify the authentication request, the authentication request containing simulation data regarding self-driving testing of the vehicle in a simulated driving scene and authentication award information; and the storage unit 502 is configured to: in the case of passing the verifying, generate an award record for an authentication node that completes verification first based on the authentication award information, and write a verification result and the award record into a distributed data block chain corresponding to the authentication system.

In some embodiments, the authentication request is generated by signing, with a private key corresponding to a user's account, the simulation data submitted by the user regarding the self-driving testing of the vehicle in the simulated driving scene; and the verification unit 501 may be further configured to: retrieve a public key corresponding to the user's account, and decipher the authentication request with the user's public key; and verify the deciphered simulation data.

In some embodiments, the simulation data may include a simulation log; and the verification unit 501 may verify the deciphered simulation data by: recording the deciphered simulation data, and monitoring whether a recording result issued from other authentication node(s) has been received before the recording is successful; if the recording is successful before receiving the recording result issued from the other authentication node(s), broadcasting the recording result to other authentication node(s) such that the authentication node(s) receiving the recording result checks the recording result according to a preset check rule; if the recording is unsuccessful before receiving the recording result issued from the other authentication node(s), checking the received recording result according to the preset check rule; in response to the number of authentication nodes where the checking passes satisfying a first preset condition, determining that the simulation data passes the verifying, and generating a verification result based on the recording result recorded for the simulation data.

In a further embodiment, the verification unit 501 may record the deciphered simulation data by: combining the simulation log and data already stored in the data block chain to form a record list, and executing an authentication operation below: performing a Hash operation based on a random number and the record list, and determining whether a Hash operation result satisfies a preset target value; if so, determining that the simulation log is successfully recorded, and generating a recording result containing the random number and the simulation data; if not, changing the random number, and performing the authentication operation.

In some embodiments, the simulation data may include a binary simulation file; and the verification unit 501 may further verify the deciphered simulation data by: executing the binary simulation file, determining whether the vehicle passes the self-driving testing based on an execution result, and broadcasting a determination result to the other authentication node(s); and in response to the number of authentication nodes which determine that the vehicle passes the self-driving testing satisfying a second preset condition, generating a verification result for indicating that the authentication request passes the verification.

In some embodiments, the storage unit 502 may generate an award record of the authentication node that first completes the verification by: generating a record of associating an award indicated by the authentication award information with a wallet address corresponding to the authentication node that first completes the verification.

In some embodiments, the data authentication apparatus 500 may further comprise: a retrieving unit configured to retrieve the simulation data submitted by the user regarding the self-driving testing of the vehicle in the simulated driving scene; and a submitting unit configured to submit the authentication request to the authentication nodes in the authentication system for authenticating that the vehicle passes the self-driving scene testing.

It should be understood that various units as provided in the apparatus 500 correspond to respective steps in the methods described with reference to FIG. 2 and FIG. 3. Therefore, the operations and characteristics described above in the methods are likewise applicable to the apparatus 500 and the units included therein, which thus will not be detailed here.

The embodiments of the present disclosure further provide a data authentication system, comprising at least two authentication nodes, which at least two authentication nodes store the data using a distributed data block chain. The structural diagram of the data authentication system is shown in FIG. 1. The respective authentication nodes may be distributed at different geographical locations and connected with clients of corresponding users.

The authentication nodes in the authentication system are configured to execute the data authentication methods described in the embodiments above, specifically configured to: in response to receiving an authentication request for authenticating that a vehicle passes a self-driving scene testing, verify the authentication request; in the case that the verifying passes, generate an award record for an authentication node that completes verification first based on authentication award information, and write a verification result and the award record into a distributed data block chain corresponding to the authentication system; wherein the authentication request includes simulation data regarding self-driving testing of the vehicle in a simulated driving scene and the authentication award information.

The respective authentication nodes in the authentication system may act as a receiving end to monitor an authentication request issued from other authentication node(s), and when receiving the authentication request issued from any other authentication node for authenticating that the vehicle passes the self-driving scene testing, to initiate a verification on the authentication request. Here, the authentication request may be issued after any other authentication node receives the simulation data submitted by the user through the client. The specific verification method may comprise: parsing the authentication request to obtain the simulation data therein, and verify authenticity of the simulation data, e.g., it may be determined whether the simulation data satisfies a preset reliable condition.

The respective authentication nodes receiving the authentication request may simultaneously verify the authentication request. When one authentication node thereof completes the verification and determines that the simulation data is credible, or when the authentication nodes the number of which satisfies a preset number complete the verification and determine that the simulation data is credible, it may be determined that the verification on the authentication request passes. During this process, the respective authentication nodes maintain communication such that they may transmit the verification result to each other.

The respective authentication nodes in the authentication system store a same data block chain, the data block chain recording all authenticated data in the authentication system. After determining that the verification on the authentication request passes, the authentication nodes may generate an award record for the authentication node that first completes the verification based on the authentication award information, and write a verification result and the award record into the data block chain.

In some embodiments, the authentication request is generated by signing, with a private key corresponding to a user's account, the simulation data submitted by the user regarding the self-driving testing of the vehicle in the simulated driving scene. Then, the authentication node(s) receiving the authentication request may verify the authentication request by: retrieving a public key corresponding to the user's account, and deciphering the authentication request using the user's public key; and verifying the deciphered simulation data.

In some embodiments, the simulation data may include a simulation log; and the authentication nodes receiving the authentication request may verify the deciphered simulation data by: recording the deciphered simulation data, and monitoring whether a recording result issued from other authentication node(s) has been received before the recording is successful; if the recording is successful before receiving the recording result issued from the other authentication node(s), broadcasting the recording result to other authentication node(s) such that the authentication node(s) receiving the recording result checks the recording result according to a preset check rule; if the recording is unsuccessful before receiving the recording result issued from the other authentication node(s), checking the received recording result according to the preset check rule; in response to the number of authentication nodes where the checking passes satisfying a first preset condition, determining that the simulation data passes the verifying, and generating a verification result based on the recording result recorded for the simulation data.

Further, the authentication nodes receiving the authentication request may record the deciphered simulation data by: combining the simulation log and data already stored in the data block chain to form a record list, and executing an authentication operation below: performing a Hash operation based on a random number and the record list, and determining whether a Hash operation result satisfies a preset target value; if so, determining that the simulation log is successfully recorded, and generating a recording result containing the random number and the simulation data; if not, changing the random number, and performing the authentication operation.

In some embodiments, the simulation data may include a binary simulation file, and the authentication nodes receiving the authentication request may verify the deciphered simulation data by: executing the binary simulation file, determining whether the vehicle passes the self-driving testing based on an execution result, and broadcasting a determination result to the other authentication node(s); and in response to the number of authentication nodes which determine that the vehicle passes the self-driving testing satisfying a second preset condition, generating a verification result for indicating that the authentication request passes the verification.

In some embodiments, the authentication node may generate, after the verification passes, a record of associating an award indicated by the authentication award information with a wallet address corresponding to the authentication node that first completes the verification, as the award record generated for the authentication node that first completes the verification based on the authentication award information.

In some embodiments, the authentication nodes may act as a requesting end and may be configured for retrieving the simulation data submitted by the user regarding the self-driving testing of the vehicle in the simulated driving scene, and submitting an authentication request for authenticating that the vehicle passes the self-driving scene testing to other authentication node(s) in the authentication system. The other authentication node(s) as receiving ends execute an operation of verifying the authentication request issued by the requesting end.

Figure 6:
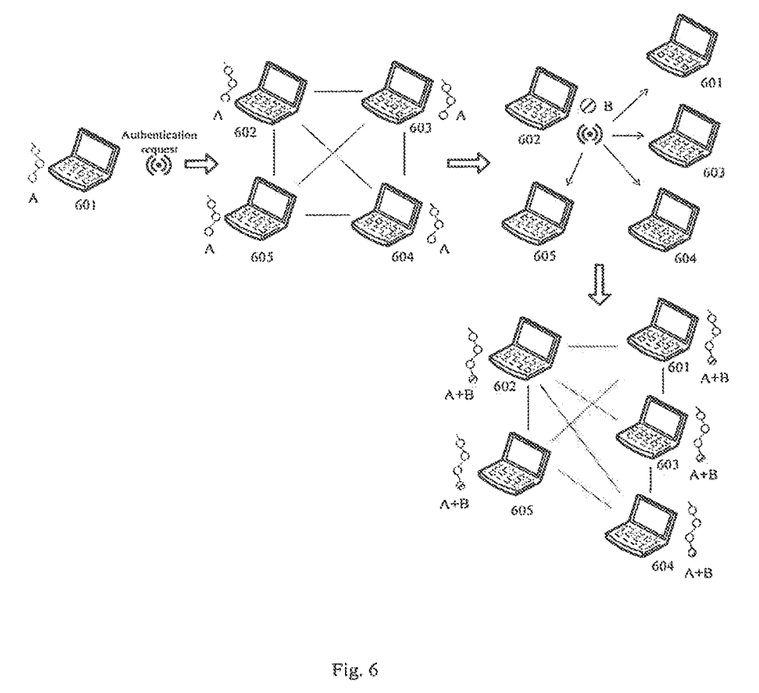
FIG. 6 is a schematic diagram showing a structure of a data authentication system and an application scenario thereof according to the present disclosure.

FIG. 6 schematically illustrates a structure of the data authentication system according to the present disclosure as well as an application scenario thereof. As shown in FIG. 6, the authentication system comprises authentication nodes 601, 602, 603, 604, and 605; the respective authentication nodes are connected with each other; besides, each authentication node stores a data block chain A. After the authentication node 601 broadcasts the authentication request including the simulation data to other authentication nodes, the other nodes 602, 603, 604, and 605 execute a verification operation on the authentication request. After the authentication node 602 first completes the verification to generate a new block B, it broadcasts the new block B to the other authentication nodes 601, 603, 604, and 605, such that the other authentication nodes may check the new block B; after passing the checking, the respective authentication nodes 601, 602, 603, 604, and 605 write the new block B into an end of the block chain A, forming a block chain A+B.

Figure 7:
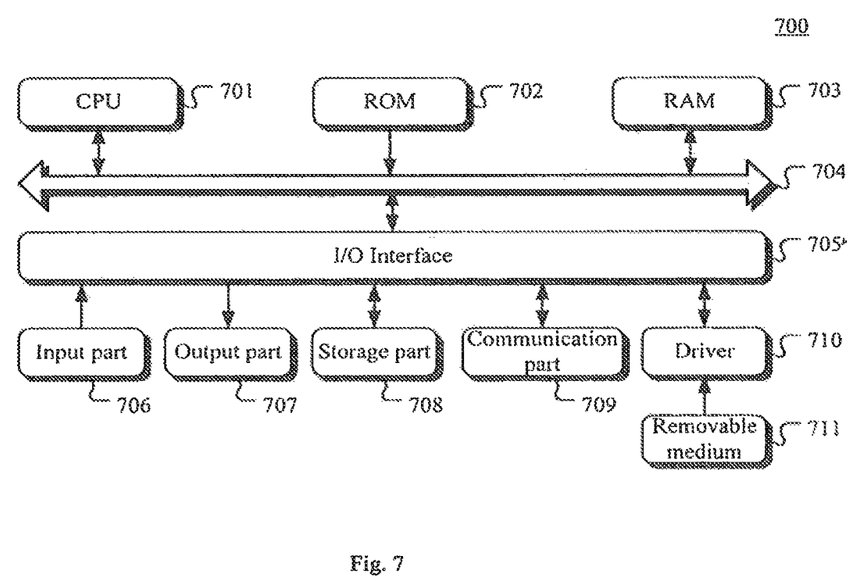
FIG. 7 is a structural schematic diagram of a computer system at respective authentication nodes in a data authentication system, which is adapted for implementing the embodiments of the present disclosure.

Now, refer to FIG. 7, which shows a structural schematic diagram of a computer system 700 of respective authentication nodes in a data authentication system, which is adapted for implementing the embodiments of the present disclosure. The computer system shown in FIG. 7 is only an example, which should not bring any limitation to the functions and use scopes of the embodiments of the present disclosure.

As shown in FIG. 7, the computer system 700 comprises a central processing unit (CPU) 701 which may perform various kinds of appropriate actions and processing based on computer program stored in a read-only memory (ROM) 702 or computer program loaded into the random-access memory (RAM) 703 from a memory part 708. In RAM 703, there may also store various kinds of programs and data needed for operations of the system 700. CPU 701, ROM 702, and RAM 703 are connected with each other via a bus 704. The input/output (I/O) interface 705 may also be connected to the bus 704.

The following components are connected to the I/O interface 705, including: an input part 706 including such as a keyboard, a mouse, and etc.; an output part 707 including such as a cathode-ray tube (CRT), an LCD (Liquid Crystal Display), and a loudspeaker, etc.; a memory part 708 including a hard disk, etc.; and a communication part 709 including a network interface card such as a LAN (Local Area Network) card, a modem, etc. The communication part 709 performs communication processing via a network such as the Internet. A driver 710 is also connected to the I/O interface 705 as needed. A removable medium 711, such as a magnetic disk, an optical disk, a magneto-optical disk, and a semiconductor memory, etc., is mounted on the driver 710 as needed, so as to facilitate the computer program read therefrom to be installed in the memory part 708.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 709 and/or installed from the removable medium 711. When being executed by the central processing unit (CPU) 701, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages (such as Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising a verification unit and a storage unit. Particularly, names of these units do not constitute limitations to those units. For example, the verification unit may also be described as "a unit for: in response to receiving an authentication request submitted to authentication nodes in an authentication system for authenticating that a vehicle passes self-driving scene testing, verifying the authentication request."

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: in response to receiving an authentication request submitted to authentication nodes in an authentication system for authenticating that a vehicle passes self-driving scene testing, verify the authentication request, the authentication request containing simulation data regarding self-driving testing of the vehicle in a simulated driving scene and authentication award information; in the case of passing the verifying, generate an award record for an authentication node that completes verification first based on the authentication award information, and write a verification result and the award record into a distributed data block chain corresponding to the authentication system.

What have been described above are only embodiments of the present disclosure and an illustration of the technical principle as exerted. Those skilled in the art should understand, the scope of the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A data authentication method, comprising:
   in response to receiving an authentication request submitted to authentication nodes in an authentication system for authenticating that a vehicle passes self-driving scene testing, verifying the authentication request, the authentication request containing simulation data regarding self-driving testing of the vehicle in a simulated driving scene and authentication award information;
   in a case of passing the verifying, generating an award record for an authentication node that completes verification first based on the authentication award information, and writing a verification result and the award record into a distributed data block chain corresponding to the authentication system.

2. The method according to claim 1, wherein the authentication request is generated by signing, with a private key corresponding to a user's account, the simulation data submitted by the user regarding the self-driving testing of the vehicle in the simulated driving scene; and wherein
   the verifying the authentication request comprises:
   retrieving a public key corresponding to the user's account, and deciphering the authentication request with the user's public key; and
   verifying the deciphered simulation data.

3. The method according to claim 2, wherein the simulation data includes a simulation log; and wherein
   the verifying the deciphered simulation data comprises:
   recording the deciphered simulation data, and monitoring whether a recording result issued from other authentication node(s) has been received before the recording is successful;
   if the recording is successful before receiving the recording result issued from the other authentication node(s), broadcasting the recording result to one or more other authentication node(s) such that the one or more other authentication node(s) receiving the recording result checks the recording result according to a preset check rule;
   if the recording is unsuccessful before receiving the recording result issued from the other authentication node(s), checking the received recording result according to the preset check rule; and
   in response to a number of authentication nodes where the checking passes satisfying a first preset condition, determining that the deciphered simulation data passes the verifying, and generating a verification result based on the recording result recorded for the deciphered simulation data.

4. The method according to claim 3, wherein the recording the deciphered simulation data comprises:
   combining the simulation log and data already stored in the data block chain to form a record list, and executing an authentication operation below: performing a Hash operation based on a random number and the record list, and determining whether a Hash operation result satisfies a preset target value;
   if so, determining that the simulation log is successfully recorded, and generating a respective recording result containing the random number and the simulation data; and
   if not, changing the random number, and performing the authentication operation.

5. The method according to claim 2, wherein the simulation data includes a binary simulation file; and wherein
   the verifying the deciphered simulation data comprises:
   executing the binary simulation file, determining whether the vehicle passes the self-driving testing based on an execution result, and broadcasting a determination result to the other authentication node(s); and
   in response to a number of authentication nodes which determine that the vehicle passes the self-driving testing satisfying a second preset condition, generating a verification result for indicating that the authentication request passes the verification.

6. The method according to claim 1, wherein the generating an award record for an authentication node that completes verification first based on the authentication award information comprises:
   generating a record of associating an award indicated by the authentication award information with a wallet address corresponding to the authentication node that first completes the verification.

7. The method according to claim 1, further comprising:
   retrieving the simulation data submitted by a user regarding the self-driving testing of the vehicle in the simulated driving scene; and
   submitting the authentication request to the authentication nodes in the authentication system for authenticating that the vehicle passes the self-driving scene testing.

8. A data authentication apparatus, comprising:
   a verification unit configured to: in response to receiving an authentication request submitted to authentication nodes in an authentication system for authenticating that a vehicle passes self-driving scene testing, verify the authentication request, the authentication request containing simulation data regarding self-driving testing of the vehicle in a simulated driving scene and authentication award information; and
   a storage unit configured to: in a case of passing the verifying, generate an award record for an authentication node that completes verification first based on the authentication award information, and write a verification result and the award record into a distributed data block chain corresponding to the authentication system.

9. A data authentication system, comprising at least two authentication nodes that store data using a distributed data block chain, the authentication nodes being configured to:
   in response to receiving an authentication request for authenticating that a vehicle passes self-driving scene testing, verify the authentication request, the authentication request containing simulation data regarding self-driving testing of the vehicle in a simulated driving scene and authentication award information;
   in a case of passing the verifying, generate an award record for an authentication node that completes verification first based on the authentication award information, and write a verification result and the award record into a distributed data block chain corresponding to the authentication system.

10. The data authentication system according to claim 9, wherein the authentication request is generated by signing, using a private key corresponding to a user's account, the simulation data submitted by the user regarding the self-driving testing of the vehicle in the simulated driving scene; and wherein the authentication nodes verify the authentication request by:

retrieving a public key corresponding to the user's account, and deciphering the authentication request with the user's public key; and verifying the deciphered simulation data.

11. The data authentication system according to claim 10, wherein the simulation data includes a simulation log; and wherein the authentication nodes verify the authentication request by:

recording the deciphered simulation data, and monitoring whether a recording result issued from other authentication node(s) has been received before the recording is successful;

if the recording is successful before receiving the recording result issued from the other authentication node(s), broadcasting the recording result to one or more other authentication node(s) such that the one or more other authentication node(s) receiving the recording result checks the recording result according to a preset check rule;

if the recording is unsuccessful before receiving the recording result issued from the other authentication node(s), checking the received recording result according to the preset check rule; and in response to a number of authentication nodes where the checking passes satisfying a first preset condition, determining that the deciphered simulation data passes the verifying, and generating a verification result based on the recording result recorded for the deciphered simulation data.

12. The data authentication system according to claim 11, wherein the authentication nodes record the deciphered simulation data by:

combining the simulation log and data already stored in the data block chain to form a record list, and executing an authentication operation below: performing a Hash operation based on a random number and the record list, and determining whether a Hash operation result satisfies a preset target value;

if so, determining that the simulation log is successfully recorded, and generating a respective recording result containing the random number and the simulation data; and if not, changing the random number, and performing the authentication operation.

13. The data authentication system according to claim 10, wherein the simulation data includes a binary simulation file; and wherein the authentication nodes check the deciphered simulation data by:

executing the binary simulation file, determining whether the vehicle passes the self-driving testing based on an execution result, and broadcasting a determination result to the other authentication node(s); and in response to a number of authentication nodes determining that the vehicle passes the self-driving testing satisfying a second preset condition, generating a verification result for indicating that the authentication request passes the verification.

14. The data authentication system according to claim 9, wherein the authentication nodes generate an award record by:

generating a record of associating an award indicated by the authentication award information with a wallet address corresponding to the authentication node that first completes the verification.

15. The data authentication system according to claim 9, wherein the authentication nodes are further configured to:

retrieve the simulation data submitted by a user regarding the self-driving testing of the vehicle in the simulated driving scene; and submit the authentication request to the other authentication node(s) in the authentication system for authenticating that the vehicle passes the self-driving scene testing.

16. An electronic device, comprising:

one or more processors; and a storage storing one or more programs which, when being executed by the one or more processors, cause the one or more processors to implement the data authentication method of claim 1.

17. A non-transitory computer readable storage medium on which a computer program is stored, wherein when the program is executed by a processor, the data authentication method of claim 1 is implemented.

* * * * *